United States Patent
Burek et al.

(10) Patent No.: US 10,527,811 B2
(45) Date of Patent: Jan. 7, 2020

(54) METHOD OF INSTALLING AN OPTICAL FIBER AT USER PREMISES

(71) Applicant: OFS Fitel, LLC, Norcross, GA (US)

(72) Inventors: Denis E. Burek, Cumming, GA (US); Willard C White, Suwanee, GA (US); Xavier Chiron, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/057,012

(22) Filed: Aug. 7, 2018

(65) Prior Publication Data

US 2018/0341079 A1    Nov. 29, 2018

Related U.S. Application Data

(63) Continuation of application No. 15/712,754, filed on Sep. 22, 2017, now Pat. No. 10,139,582.

(60) Provisional application No. 62/462,453, filed on Feb. 23, 2017.

(51) Int. Cl.
  *G02B 6/44*    (2006.01)
  *G02B 6/38*    (2006.01)

(52) U.S. Cl.
  CPC ......... *G02B 6/4457* (2013.01); *G02B 6/3897* (2013.01); *G02B 6/4441* (2013.01); *B65H 2701/00* (2013.01); *G02B 6/4452* (2013.01); *G02B 6/4466* (2013.01)

(58) Field of Classification Search
  CPC .... G02B 6/3825; G02B 6/3897; G02B 6/444; G02B 6/4441; G02B 6/4452; G02B 6/4455; G02B 6/4457; G02B 6/4466; G02B 6/4471; G02B 6/46; B65H 2701/00
  USPC .............................. 385/134–139; 242/598.6
  See application file for complete search history.

(56) References Cited

U.S. PATENT DOCUMENTS

| 9,904,026 B2 * | 2/2018 | Burek .................. G02B 6/4441 |
| 2014/0161411 A1 * | 6/2014 | Slater .................. G02B 6/4471 |
|  |  | 385/135 |

\* cited by examiner

*Primary Examiner* — Michael P Mooney
(74) *Attorney, Agent, or Firm* — Law Office of Leo Zucker (57) ABSTRACT

A fiber storage module having a removable supply spool is mounted inside a user premises. The module is arranged to retain the spool at either a first position where the spool can freely rotate, or a second position where the spool is locked. While the spool is removed from the module, a length of fiber sufficient to route from an entry point to the premises to the mounted module, and from the module to an optical device inside the premises, is wound on the spool. The spool with the wound fiber is retained at the first position inside the module, and the fiber is unwound and adhered or fastened to a supporting surface along a determined routing path at the premises. The spool is then locked at the second position, and a length of the remaining fiber is removed for connection to the optical device.

20 Claims, 5 Drawing Sheets

METHOD OF INSTALLING AN OPTICAL FIBER AT USER PREMISES

CROSS REFERENCE TO RELATED APPLICATIONS

This application is a continuation under 35 U.S.C. § 120 of our co-pending U.S. patent application Ser. No. 15/712,754 filed Sep. 22, 2017, and titled "Fiber Optic Storage Module For Installation at User Premises." The '754 application claims priority under 35 U.S.C. § 119(e) of U.S. Provisional Patent Application No. 62/462,453 filed Feb. 23, 2017, and titled "No-Adapter Module and Spool."

BACKGROUND OF THE INVENTION

Field of the Invention

The present invention relates to methods or procedures for installing an optical fiber inside the premises of a fiber optic network user, and particularly to methods that include the use of a module for storing a supply spool from which the fiber is unwound.

Discussion of the Known Art

During a typical fiber-to-the-home (FTTH) installation at the premises of a fiber optic network user, a drop fiber is unwound from a supply spool and routed over a path that is out of the ordinary view of the premises occupants. For example, the fiber may be stapled or bonded with an adhesive to a crown molding or a baseboard over the routing path. The path extends between an entry point to the premises where a provider network terminal is located for connection to one end of the drop fiber (hereafter "the entry point"), and a storage module mounted on a wall behind a desk or television inside the premises. Any unwound or "slack" length of the drop fiber is allowed to remain on the supply spool, and the spool is stored inside the module.

A free end of the slack fiber on the spool is terminated in a connector, and the connector is mated to one side of an adapter inside the module. The other side of the adapter is exposed outside the module, and one end of a short fiber jumper cable is connected to the exposed side of the adapter. The other end of the jumper cable is connected to an optical network terminal (ONT) at the premises. See, e.g., U.S. Pat. No. 9,429,720 (Aug. 30, 2016) and U.S. Pat. No. 8,818,157 (Aug. 26, 2014), both of which are incorporated by reference.

The ONT operates to convert downlink optical signals sent from the network terminal through the drop fiber and the fiber jumper cable, into corresponding electrical signals that are produced at an output of the ONT. One end of a wire cable is connected to the ONT output, and the other end of the wire cable is connected to the television or to a router that is configured to link other electronic devices at the premises with the fiber optic network. The ONT also converts signals originating from the electronic devices into corresponding uplink optical signals that are sent to the network terminal through the jumper cable and the drop fiber.

Although the typical FTTH installation procedure described above operates well and is widely deployed, there is a desire for a procedure that uses fewer components and consumes less installation time at the premises. so that overall costs to the user and the network provider are reduced.

SUMMARY OF THE INVENTION

According to the invention, a method of installing an optical fiber between an entry point to a user premises and an optical device inside the premises, includes mounting a storage module having a removable fiber supply spool at a determined location inside the premises, and arranging the module to retain the spool inside the module at either a first position where the spool rotates freely, or a second position where the spool is locked from rotation. While the spool is removed from the module, a length of the optical fiber sufficient to route from the premises entry point to the module when mounted, and from the module to the optical device inside the premises, is wound on the spool.

The spool with the wound fiber is retained at the first position inside the module, and the fiber is unwound and adhered or fastened to a supporting surface between the entry point to the premises and the module. The spool is then locked at the second position, and a length of the fiber remaining on the spool is removed for connection to the optical device inside the premises.

According to another aspect of the invention, a method of installing an optical fiber between an entry point to a user premises, and an optical device located inside the premises, includes providing a fiber optic storage module having a body, and a removable fiber supply spool having a first winding section and a second winding section. The module retains the spool at a selected one of a first position where the spool is free to rotate about its axis, and a second position at which the spool is locked from rotation. The storage module is mounted at a determined location on a wall or other supporting surface inside the premises.

While the spool is removed from the storage module, a first length of the fiber is wound within the first winding section of the spool, the first length being sufficient to route the fiber between the entry point to the premises and the module when mounted inside the premises. A second length of the fiber is wound within the second winding section of the spool, the second length being sufficient to extend between the module when mounted and the optical device inside the premises.

After the winding steps, the spool is retained at the first position inside the module, and the first length of the fiber is unwound from the first winding section of the spool by pulling the fiber through an opening in the body of the module as the spool freely rotates. The first length of the fiber is connected to a terminal at the entry point to the premises, and adhered or otherwise fastened along a wall or other supporting surface at the premises.

The spool is then locked from further rotation by retaining it at the second position inside the module, and the second length of fiber is removed from the second winding section of the spool for connection to the optical device inside the premises.

According to a further aspect of the invention, a method of installing an optical fiber between an entry point to a user premises and an optical network terminal (ONT) inside the premises, includes providing a fiber optic storage module having a body, and a removable fiber supply spool having a winding section. The body of the storage module retains the supply spool at a selected one of a first position where the spool is free to rotate about its axis, and a second position at which the spool is locked from rotation. The storage module is located at a determined position on a supporting surface inside the premises.

While the spool is removed from the storage module, a determined length of the fiber is wound in the winding section of the spool, the length being sufficient to route the fiber between the entry point to the premises and the location of the ONT inside the premises.

The spool is then retained at the first position inside the module, and the fiber is unwound from the spool by pulling the fiber through an opening in the body of the module as the spool freely rotates. The unwound fiber is connected to a terminal at the entry point to the premises, and the fiber is adhered or otherwise fastened along a wall or other supporting surface inside the premises.

The spool is locked from further rotation by retaining it at the second position inside the module, and a short length of the fiber remaining on the spool is removed for connection to the ONT inside the premises.

For a better understanding of the invention, reference is made to the following description taken in conjunction with the accompanying drawing and the appended claims.

DETAILED DESCRIPTION OF THE INVENTION

As used herein, the terms "user" and "customer" are used inter-changeably to mean a natural person or a legal entity that uses telecommunication services offered by a fiber optic network provider. Such services may include, for example, Internet access, telephony, television, voice and music broadcasts, or other information and data streams that require the installation of one or more optical fibers at the location where the services are to be used by the person or entity (e.g., a private home, apartment, store, or office). Further, the words "premises," "home," and "residence" are used interchangeably to refer to the location where the services of the network provider are used by the person or entity.

Figure 1:
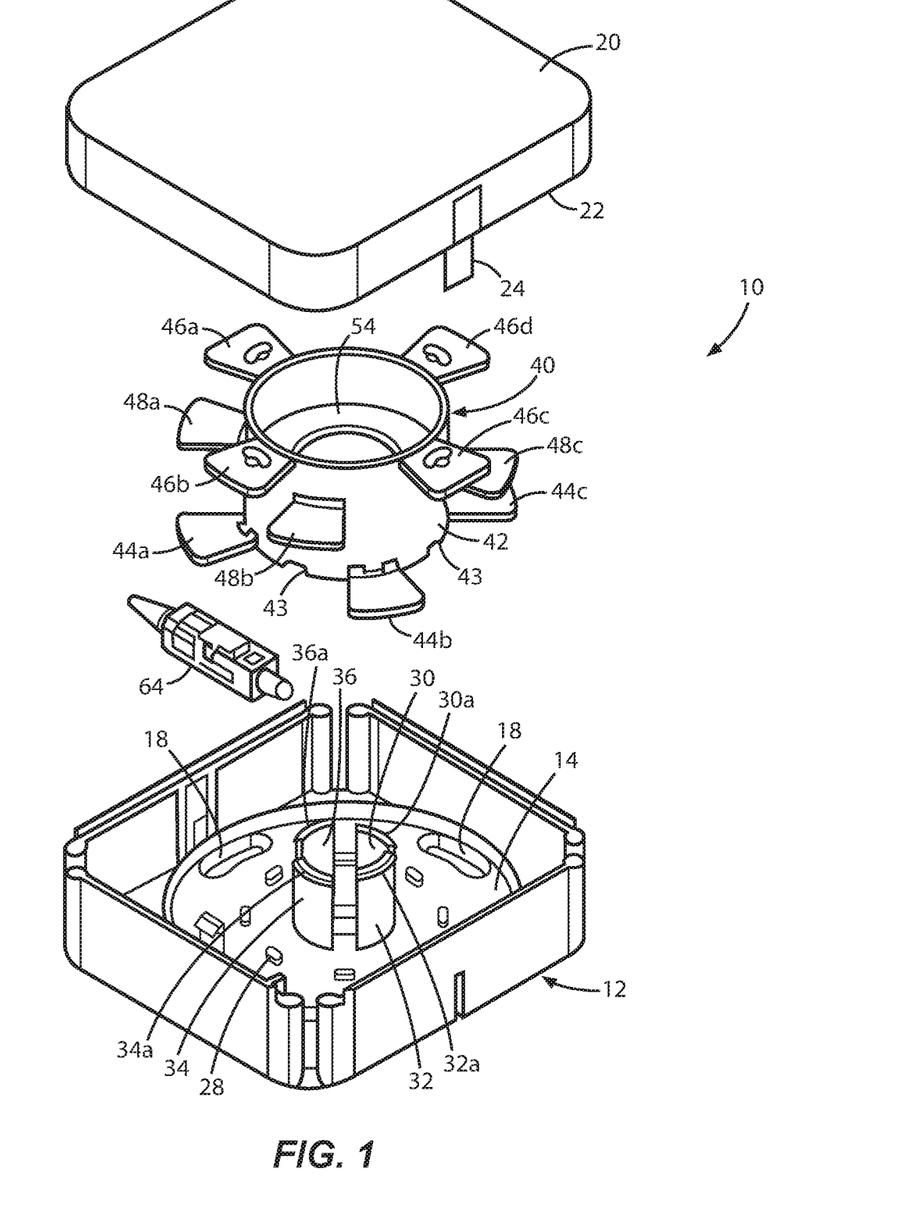
FIG. 1 is an exploded, isometric view of an optical fiber storage module according to a first embodiment of the invention.
Figure 2:
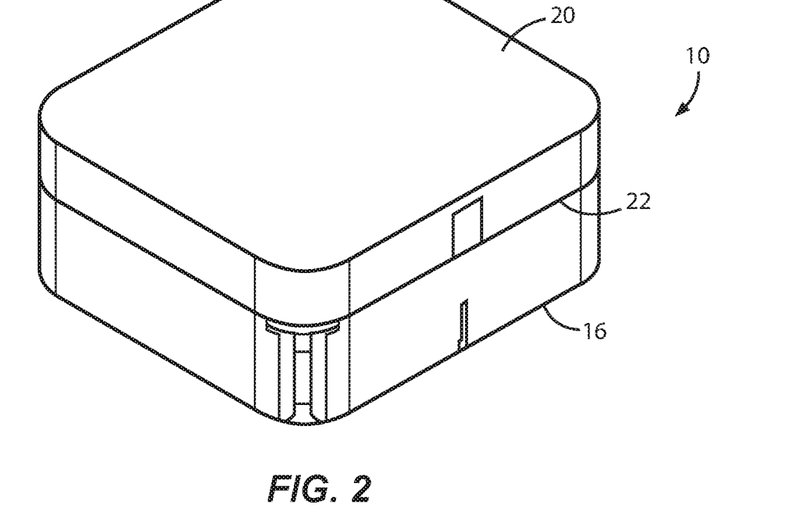
FIG. 2 is an isometric view of the module in FIG. 1 in a closed state.

FIG. 1 is an exploded view showing parts of an optical fiber storage module 10 according to a first embodiment of the invention. The parts are made from, e.g., polypropylene copolymer or an equivalent sturdy material that meets all applicable fire and smoke safety codes at the premises. When closed as shown in FIG. 2, the module 10 is of generally rectangular solid shape and measures, for example, 3.45 inches high, 3.13 inches wide, and 1.44 inches deep. The module 10 is dimensioned and configured so it can be mounted inconspicuously on a wall inside the premises.

Figure 3:
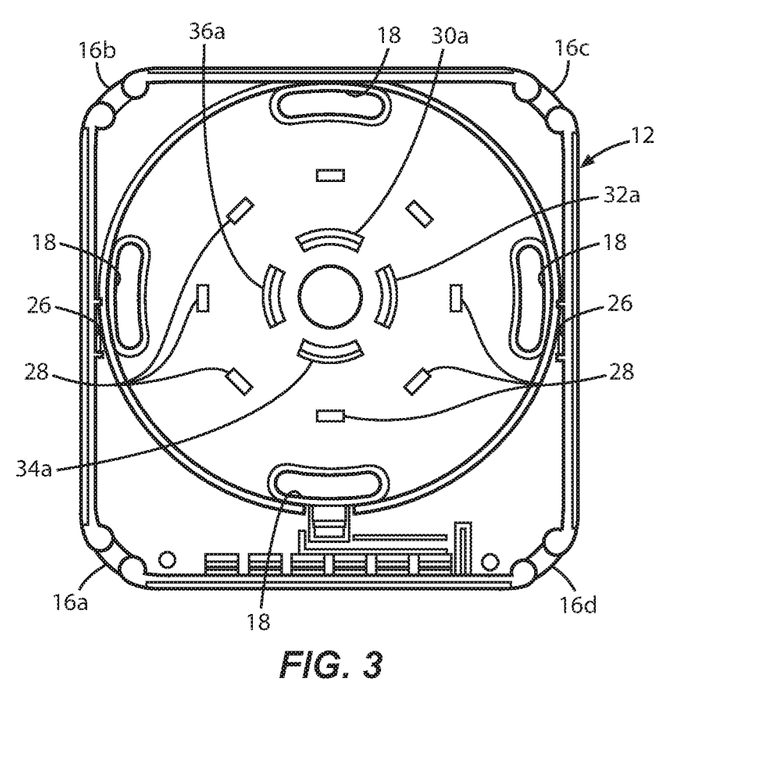
FIG. 3 is a plan view of the body of the module in FIG. 1, showing the top of a module base and a surrounding wall.
Figure 4:
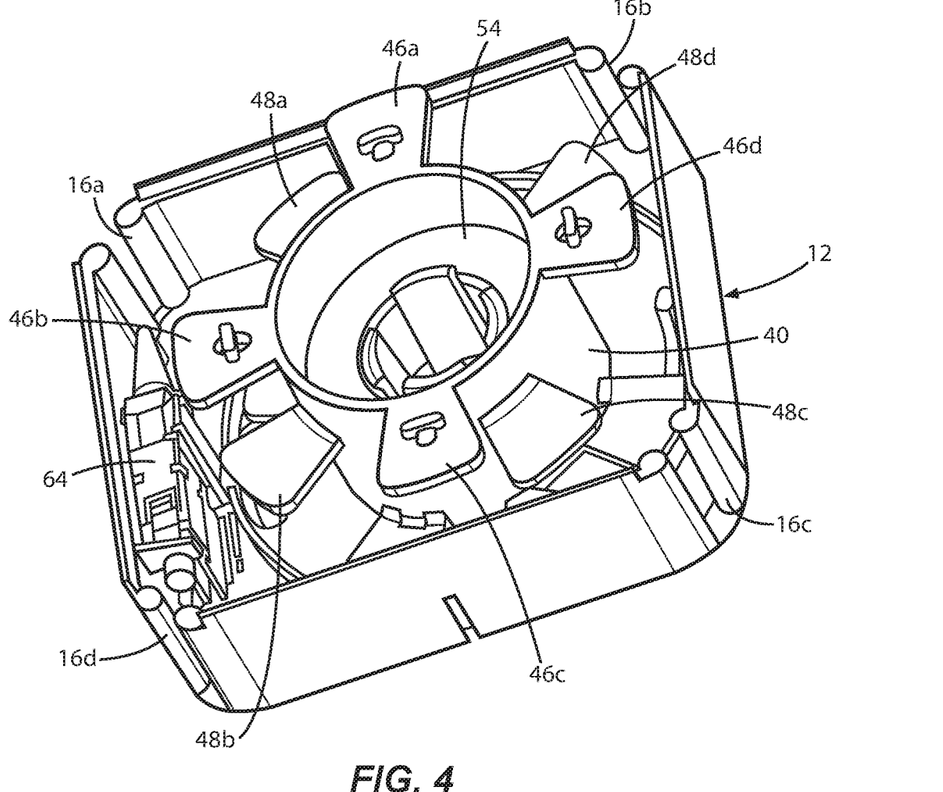
FIG. 4 is an isometric view of the interior of the module in FIG. 1 in an assembled state.

Module 10 has a body 12 which is also shown in FIGS. 3 and 4. The body 12 includes a base 14 and a wall 16 that extends upward from the perimeter of the base. The base 14 has several openings 18 to accommodate fasteners for mounting the module 10 on the wall or other supporting surface at the premises. The module 10 also includes a cover 20 having a bottom edge 22 that is dimensioned and formed to align flush with the top edge of the module wall 16 when the cover 20 is at a closed position on the module body 12 as in FIG. 2. In the illustrated embodiment, the cover 20 has a pair of resilient locking tabs 24 (one of which is shown in FIG. 1) that extend downward from opposite sides of the cover. The tabs 24 are dimensioned and formed to latch onto abutments 26 on the inside surface of the module wall 16 when the cover 20 is urged to the closed position in FIG. 2. The cover 20 can then be removed by depressing the sides of the cover from which the tabs 24 extend, so as to disengage the tabs 24 from the abutments 26.

As seen in FIGS. 1, 3, and 4, eight protuberances or bosses 28 project upward from a central portion of the module base 14, each to a height of, e.g., 0.060 inch (1.52 mm). The bosses 28 are disposed in a circular array having a diameter of, e.g., 1.650 inches (41.91 mm) and are equi-circumferentially spaced from one another. Further, a set of four elongated spool retention fingers 30, 32, 34, 36 also extend upward from the central portion of the base 14. The retention fingers 30-36 are disposed in a circular array having a diameter of 0.660 inch (16.76 mm) that is coaxial with the circular array of bosses 28. The fingers 30-36 are equi-circumferentially spaced, and the width of each finger spans 60 degrees so that facing side edges of adjacent fingers are 30 degrees apart.

A first pair of the retention fingers 30 and 34 which face one another (i.e., their long axes are 180 degrees apart), extend to a height of 0.625 inch (15.88 mm) above the module base 14. A second pair of the retention fingers 32 and 36 which also face one another extend to a slightly greater height of 0.695 inch (17.67 mm) above the base 14. Each of the four retention fingers 30-36 has a corresponding rim 30a-36a that projects radially outward from the top end of the finger. As explained below, when a fiber supply spool 40 is lowered onto the retention fingers 30-36, the rims 30a, 34a atop the first pair of retention fingers 30 and 34 together with the rims 32a, 36a atop the second pair of retention fingers 32 and 36, serve to retain the spool at an elevated position above the module base 14 where the spool 40 can turn freely about the fingers 30-36 over the base.

Figure 5:
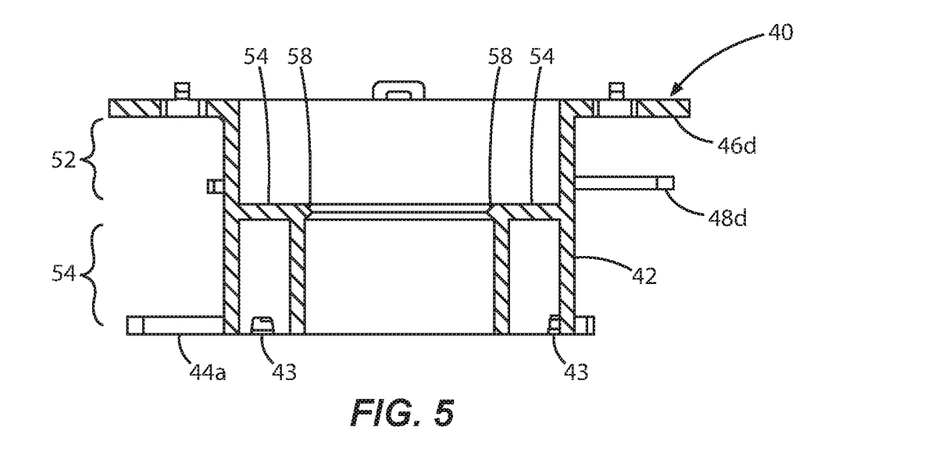
FIG. 5 is a cross-sectional view of a fiber supply spool in the module of FIG. 1.

The fiber supply spool 40 is shown in isometric views in FIGS. 1 and 4, and in cross-section in FIG. 5. Spool 40 has a cylindrical hub 42 measuring about 1.12 inches (28.45 mm) in axial height, and 1.650 inches (41.91 mm) in diameter. The spool hub 42 also has eight recesses or cutouts 43 formed along the bottom edge of the hub wall. The eight cutouts 43 are equi-angularly spaced from one another and are dimensioned to receive and engage with the eight bosses 28 on the module base 14 when the spool 40 is lowered on the retention fingers 30-36 from the elevated position to a locked position.

A first set of four flat fiber retaining ears 44a to 44d extend radially outward in equi-angularly spaced relation from the bottom of the hub 42, and a second set of four flat fiber retaining ears 46a to 46d extend radially outward in equi-angular relation from the top of the hub 42. In the first embodiment of the invention, the fiber supply spool 40 also has a third set of four flat fiber retaining ears 48a to 48d that extend radially outward in equi-angular relation from the wall of the hub 42, and at an axial distance of about 0.300 inch (7.62 mm) from the top of the hub. The first and the third sets of retaining ears 44a-44d and 48a-48d form a first winding section 50 on a lower portion of the spool hub 42, and the second and the third sets of retaining ears 46a-46d and 48a-48d define a second winding section 52 on an upper portion of the hub 42. All of the fiber retaining ears extend radially about 1.375 inches from the axis of the hub 42.

The spool 40 also contains an annular flat support disk 54, the outer circumference of which is joined coaxially to the inner circumference of the spool hub 42, and at a distance of about 0.586 inch (14.88 mm) from the bottom of the hub. A cylindrical collar 56 is joined at its upper circumference to the inner circumference of the support disk 54, and a rim 58 is formed to project radially inward from the inner circumference of the support disk 54. The lower circumference of the collar 56 is commensurate with the bottom of the hub 42.

Prior to routing, a first portion of a continuous length of a buffered optical fiber is wound in the first winding section 50 of the spool hub 42, and a second portion of the fiber is wound in the second winding section 52 of the spool hub 42. The first portion of the fiber may consist of a length of unjacketed 900 μm O.D. buffered fiber to be routed between the module 10 when mounted at the premises, and the entry point at the premises. The second portion of the fiber has jacketing over the fiber to provide a protective layer having an O.D. of, e.g., 2.0 or 3.0 mm, wherein the length of the second portion is sufficient to extend between the mounted module 10 and the ONT or other optical device inside the premises to which the fiber will connect.

The jacketing on the second portion of the fiber provides added protection when the fiber is left unsupported and while being handled. The jacketing may also include a strength member like an aramid yarn. The two fiber portions may be formed, for example, by stripping a length of jacketing from a 2.0 mm O.D. jacketed fiber to expose a corresponding length of 900 μm buffered fiber, or by upjacketing a length of 900 buffered fiber with a 2.0 mm O.D. jacket to obtain a corresponding length of 2.0 mm O.D. jacketed fiber.

After desired lengths of the first and the second fiber portions are wound in the corresponding winding sections 50, 52 on the spool hub 42, the lower circumference of the hub collar 56 is centered over the spool retention fingers 30-36 and urged toward the module base 14. When the rim 58 on the annular support disk 54 inside the spool hub 42 is urged past the projecting rims 32a, 36a on the second (or higher) pair of retention fingers 32, 36, the projecting rims 30a, 34a on the first (or lower) pair of retention fingers 30, 34 extend beneath the rim 58 of the support disk 54 and thus act to capture the spool 40 from further downward movement. As a result, the bottom of the spool 40 is held at a sufficiently elevated position over the module base 14 so that the cutouts 43 in the bottom of the spool hub 42 cannot become engaged with the bosses 28 on the base 14, and the spool is able to rotate freely about the four retention fingers 30-36.

Next, the installer unwinds the first portion of fiber from the first winding section 50 of the spool by pulling the fiber through one of four fiber payout openings 16a to 16d that are formed at the corners of the module wall 16, until a length of fiber sufficient to route and connect to the entry point of the premises is obtained. As mentioned, the spool 40 turns freely on the retention fingers 30-36 above the module base 14 as the fiber is unwound. The side edges of the fiber payout openings 16a-d are also sufficiently rounded to avoid bending the fiber below a critical bend radius while the fiber is paid out.

The module 10 may also have a number of arcuate containment walls (not shown) that extend upward from the module base 14 to face the outer periphery of the spool 40 when the spool is mounted on the retention fingers 30-36. The containment walls may serve to ensure that fiber wound or stored on the spool 40 stays within the confines of the spool at all times. Side edges of the containment walls that might contact the fiber when payed out should also be properly rounded to avoid damaging the fiber.

Once the first portion of the fiber is connected to the entry point, the fiber is adhered, stapled, or otherwise bonded along a wall or other surface inside the premises in a manner having little if any adverse visual impact, preferably working from the point of entry to the mounted module 10. Fiber that remains in the first winding section 50 on the spool 40, or any excess fiber that was unwound, is stored in the first winding section 50 on the spool.

The spool 40 is then locked against further rotation on the retention fingers 30-36 by urging the spool toward the module base 14 so that the rim 58 on the support disk 54 inside the spool hub 42 is forced past the rims 30a, 34a of the retention fingers that project beneath the disk 54, and the bosses 28 on the module base 14 are allowed to enter the cutouts 43 in the bottom of the spool hub. When the spool 40 is so locked, the rims 30a, 34a of the retention fingers project above the rim 58 on the support disk 54, so that the spool 40 is restrained from upward movement and disengaging from the fixed bosses 28 on the module base 14.

The second or jacketed portion of the fiber is then removed by hand from the second winding section 52 at the top of the locked spool 40, until enough fiber is removed to connect to the ONT or other optical device at the premises. The free end of the jacketed fiber is terminated in an optical connector 64 (e.g., type SCA) that may be parked on the module base 14 for use by the installer if necessary. The connector 64 is then mated to a corresponding optical connector on the ONT, and the module cover 20 is closed over the module body 12 to complete the installation. Minor changes in the required length of the jacketed portion of the fiber can be accommodated by removing the module cover 20, and winding or unwinding the fiber in the second winding section 52 at the top of the spool 40.

Alternatively, if the ONT is provided with a pigtail fiber, a short length of the jacketed portion of the fiber can be removed from the spool 40 and spliced to the fiber from the ONT. To accommodate such situations, the module base 14 may be formed with a narrow space beneath the parked optical connector 64 in which, e.g., two fusion splices can be stored in 45 mm long sleeves.

Figure 6:
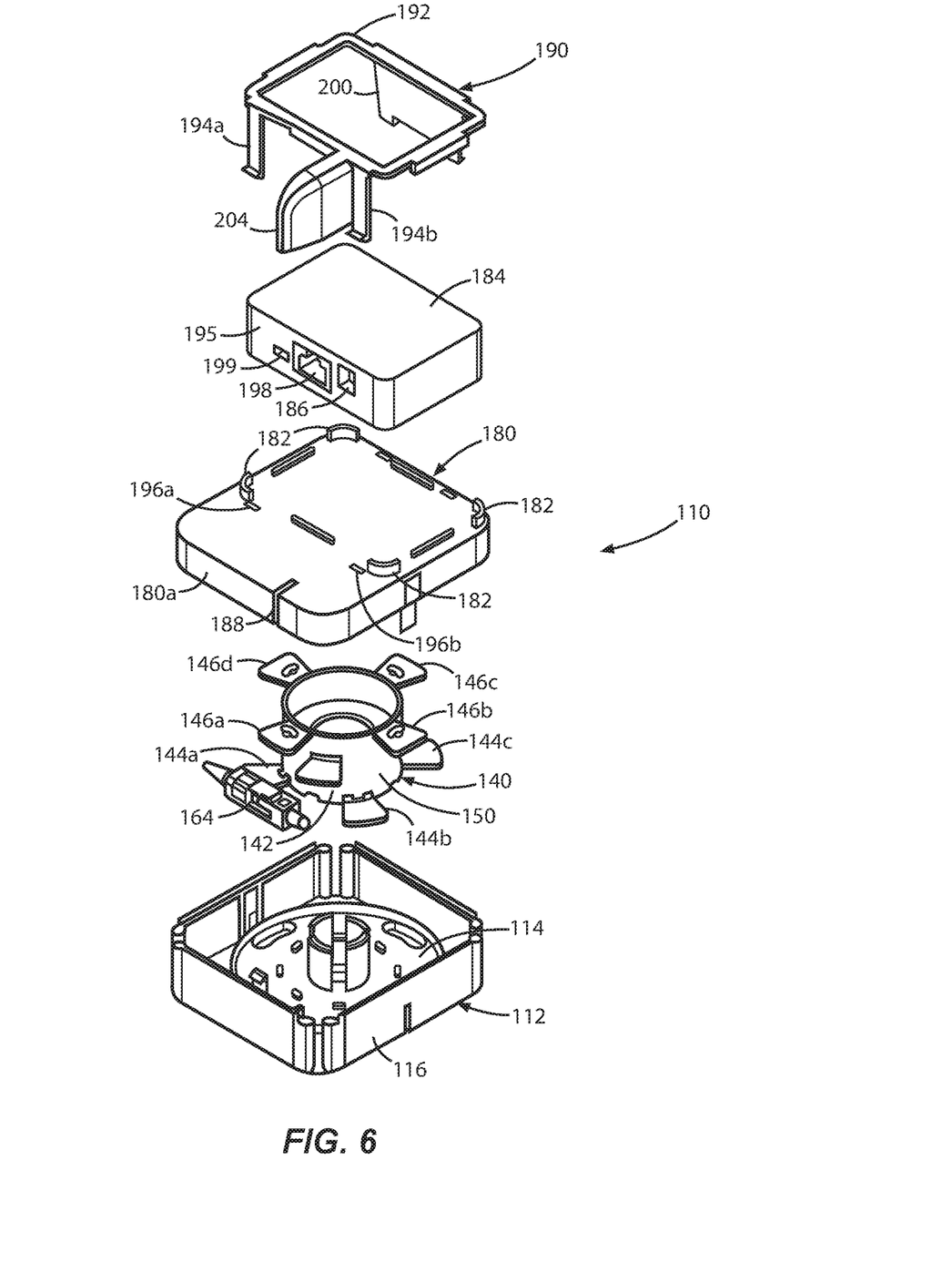
FIG. 6 is an exploded, isometric view of an optical fiber storage module according to a second embodiment of the invention.
Figure 7:
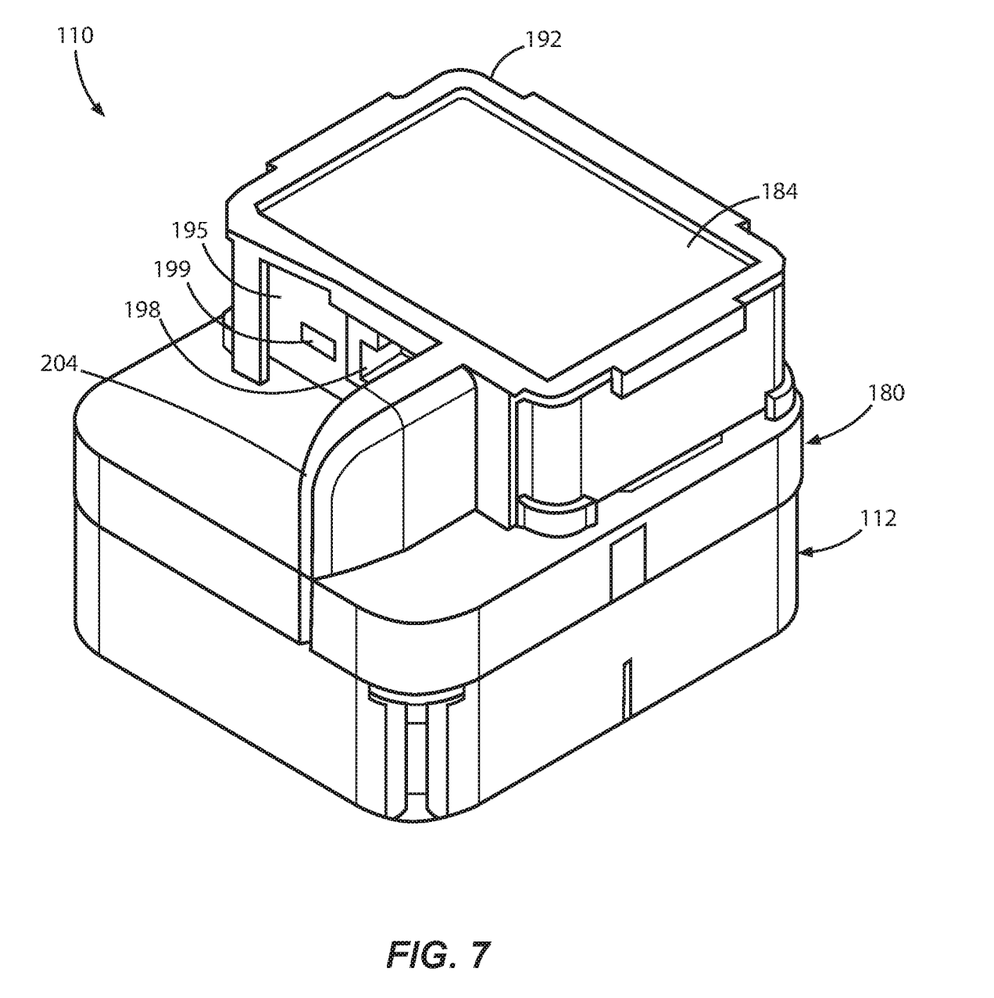
FIG. 7 is an isometric view of the module in FIG. 6 in a closed state, including an optical network terminal (ONT) mounted for operation atop a cover of the module.

FIGS. 6 and 7 show an optical fiber storage module 110 according to a second embodiment of the invention. Components of the module 110 that are the same or similar to those in the first embodiment of FIGS. 1 to 5 are identified using the same reference numerals increased by 100. The module 110 has a module body 112 including a base 114, and a wall 116 that extends upward from the outer perimeter of the base. The material, dimensions, and configuration of the module body 112 including the base 114 and the wall 116 may be identical to those of the module body 12 in the first embodiment of FIGS. 1 to 5.

Module 110 has a spool 140 which may also be identical to the spool 40 in the first embodiment, except the spool 140 lacks the third set of flat fiber retaining ears 48a to 48d provided on the spool 40. That is, the spool 140 has four flat fiber retaining ears 144a to 144d that extend radially outward in equi-angular spaced relation from the bottom of the spool hub 142, a second set of four flat fiber retaining ears 146a to 146d that extend radially outward in equi-angular relation from the top of the spool hub 142, and only one winding section 150 is defined between the first and the second sets of retaining ears. Also, the fiber that is wound on the spool 140 for routing at the premises may be entirely uniform, that is, the fiber may consist only of, e.g., an unjacketed 900 μm buffered fiber.

The module 110 includes a cover 180 which, as shown in FIG. 6, differs from the cover 20 of the module 10 by having a set of upstanding brackets 182 formed on its top surface, wherein the brackets 182 are configured and dimensioned to seat the base of a commercially available ONT 184. For example, the ONT 184 may be a model 8201 indoor dual mode single port ONT available from iPhotonix. After the fiber is unwound from the spool 140 and routed to the entry point at the premises, the spool 140 is locked from further rotation as in the first embodiment.

A short section of the fiber remaining on the spool 140 can then be removed by hand, terminated, and connected directly to a mating fiber connector 186 on the ONT 184 without any protective jacket on the fiber or the use of a separate jumper cable. The module cover 180 has a narrow slot 188 that opens through a side wall 180a and the top surface of the cover, so that the short section of fiber can be directed from the spool 140 inside the module 110 to the fiber connector 186 on the ONT 180 atop the module.

Once the ONT 184 is seated in the brackets 182 on the module cover 180 and the short section of fiber is connected to the ONT, a retainer 190 is lowered over the ONT in order to secure the ONT to the module cover 180. The retainer 190 has an open rectangular frame 192 formed and dimensioned to fit snugly about the perimeter of the ONT 184, and a pair of front legs 194a, 194b dimensioned to extend downward from the frame 192 at opposite sides of a front panel 195 on the ONT. The front legs 194a, 194b of the retainer 190 have feet that engage corresponding slots 196a, 196b in the top of the module cover 180. Except for the fiber connector 186 on the ONT, other components such as an Ethernet connector 198 and a power input jack 199 are left exposed on the front panel 195 of the ONT for use.

The ONT retainer 190 also has a rear flat wall 200 dimensioned to extend downward from the retainer frame 192 and to overlie a back wall of the ONT 184, and the retainer wall 200 has feet for engaging corresponding slots 202a, 202b atop the module cover 180. Moreover, the front of the retainer 190 has a forwardly projecting front hood 204. The hood 204 is formed and dimensioned to cover and protect the short section of fiber that passes through the slot 188 in the module cover 180, and which is terminated for connection at the front panel 195 of the ONT.

As disclosed herein, the inventive fiber storage modules 10 and 110 reduce the required number of components and the time needed to install an optical fiber at a user's premises, thus lowering the cost of the installation to the user and the service provider. Adapters and fiber jumper cables previously needed for such installations are eliminated. Insertion losses or potential failures of the adapter, the jumper cable, and their associated connectors are likewise eliminated. The present invention therefore provides a fewest-component solution for FTTH and other fiber installations. The installation can be performed speedily, and the number of reliable optical connections that need to be made during the installation is reduced.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A method of installing an optical fiber between an entry point to a user premises, and an optical device located inside the premises, comprising:
   mounting a storage module having a removable fiber supply spool inside the user premises;
   arranging the storage module to retain the fiber supply spool inside the module at either a first position where the spool rotates freely, or a second position where the spool is locked from rotation;
   while the fiber supply spool is removed from the storage module, winding a length of the optical fiber on the spool sufficient to route from the premises entry point to the module when mounted, and from the module to the optical device inside the premises, on the spool;
   retaining the fiber supply spool with the wound fiber at the first position inside the storage module;
   unwinding the fiber from the fiber supply spool and adhering or fastening the fiber to a supporting surface inside the premises between the entry point and the storage module;
   locking the fiber supply spool at the second position inside the storage module; and
   removing an end of the fiber remaining on the supply spool for connection to the optical device inside the premises.

2. A method according to claim 1, including mounting an optical network terminal (ONT) atop a cover of the fiber storage module, and connecting the end of the fiber remaining on the supply spool to the ONT.

3. A method of installing an optical fiber between an entry point to a user premises, and an optical device located inside the premises, comprising:
   providing a fiber optic storage module having a body, and a removable fiber supply spool having a first winding section and a second winding section;
   arranging the body of the storage module to retain the fiber supply spool inside the module at a selected one of a first position whereat the spool is free to rotate about an axis of the spool, and a second position whereat the spool is locked from rotation about its axis;
   mounting the body of the storage module at a determined location on a wall or other supporting surface inside the user premises;
   while the fiber supply spool is removed from the body of the storage module:
     winding a first length of the optical fiber to be installed at the premises within the first winding section of the spool, the first length being sufficient to route the fiber between the entry point to the user premises and the location of the module when mounted inside the premises, and
     winding a second length of the optical fiber within the second winding section of the spool, the second length being sufficient to extend between the location of the module when mounted and the optical device inside the premises;
   retaining the fiber supply spool at the first position inside the storage module when mounted after the winding steps;
   unwinding the first length of the optical fiber from the first winding section of the fiber supply spool by pulling the fiber through an opening in the body of the module as the spool rotates freely about its axis;

connecting the first length of the optical fiber to a terminal at the entry point to the user premises, and adhering or otherwise bonding the fiber along a wall or other supporting surface inside the premises;

locking the fiber supply spool from further rotation by retaining the spool at the second position inside the module; and removing the second length of the optical fiber from the second winding section of the fiber supply spool, and connecting the fiber to the optical device located inside the premises.

4. A method of installing an optical fiber according to claim 3, including jacketing the second length of the optical fiber.

5. A method of installing an optical fiber according to claim 3, including parking an optical connector inside the body of the storage module.

6. The method of claim 3, including removing the optical connector from a parked position inside the body of the storage module, and terminating the second length of the optical fiber with the optical connector.

7. A method of installing an optical fiber according to claim 3, including splicing an end of the second length of the optical fiber to an end of a pigtail fiber that connects to the optical device inside the premises.

8. The method of claim 7, including storing the spliced ends of the second length of the optical fiber and the pigtail fiber in a space formed inside the body of the storage module.

9. A method of installing an optical fiber according to claim 3, including placing a cover over the body of the storage module.

10. The method of claim 9, including accommodating required changes in the second length of the optical fiber by removing the cover, and winding or unwinding the second length of the optical fiber within the second winding section of the fiber supply spool.

11. A method of installing an optical fiber according to claim 3, including arranging an optical network terminal (ONT) inside the premises, and connecting the second length of the optical fiber to the ONT.

12. A method of installing an optical fiber between an entry point to a user premises, and an optical network terminal (ONT) located inside the premises, comprising:

providing a fiber optic storage module having a body, and a removable fiber supply spool having a winding section;

arranging the body of the storage module to retain the fiber supply spool inside the module at a selected one of a first position whereat the spool is free to rotate about an axis of the spool, and a second position whereat the spool is locked from rotation about its axis;

mounting the body of the storage module at a determined location on a supporting surface inside the user premises;

while the fiber supply spool is removed from the body of the storage module, winding a determined length of the optical fiber to be installed at the premises within the winding section of the spool, the length being sufficient to route the fiber between the entry point to the user premises and the location of the ONT inside the premises;

retaining the fiber supply spool at the first position inside the storage module after the optical fiber is wound within the winding section of the spool;

unwinding the optical fiber from the winding section of the fiber supply spool by pulling the fiber through an opening in the body of the storage module as the spool rotates freely about its axis;

connecting the unwound optical fiber to a terminal at the entry point to the user premises, and adhering or otherwise bonding the fiber along a wall or other supporting surface inside the premises;

locking the fiber supply spool from further rotation by retaining the spool at the second position inside the storage module; and removing a relatively short length of the optical fiber remaining on the supply spool, and connecting the fiber to the ONT inside the premises.

13. A method of installing an optical fiber according to claim 12, including parking an optical connector inside the body of the storage module.

14. The method of claim 13, including removing the optical connector from a parked position inside the body of the storage module, and terminating the removed section of the optical fiber with the optical connector.

15. A method of installing an optical fiber according to claim 12, including splicing an end of the removed section of the optical fiber to an end of a pigtail fiber that connects to the ONT.

16. The method of claim 15, including storing the spliced ends of the removed section of the optical fiber and the pigtail fiber in a space formed inside the body of the storage module.

17. A method of installing an optical fiber according to claim 12, including placing a cover over the body of the storage module.

18. The method of claim 17, including configuring a top surface of the cover for seating the ONT, and forming an opening in the cover for passage of the removed section of the optical fiber from the supply spool inside the storage module, to the ONT when seated on the cover.

19. The method of claim 18, including protectively covering the removed section of the optical fiber between the opening in the cover and the ONT.

20. The method of claim 19, including forming a retainer to secure the ONT to the cover, and providing the retainer with a hood for protectively covering the removed section of the optical fiber.

* * * * *